Dec. 11, 1928.
J. S. REYNOLDS
1,694,951
MEANS FOR MAINTAINING PRESSURE ON LIQUID FOR USE IN VEHICLE BRAKING
Filed Feb. 16, 1926
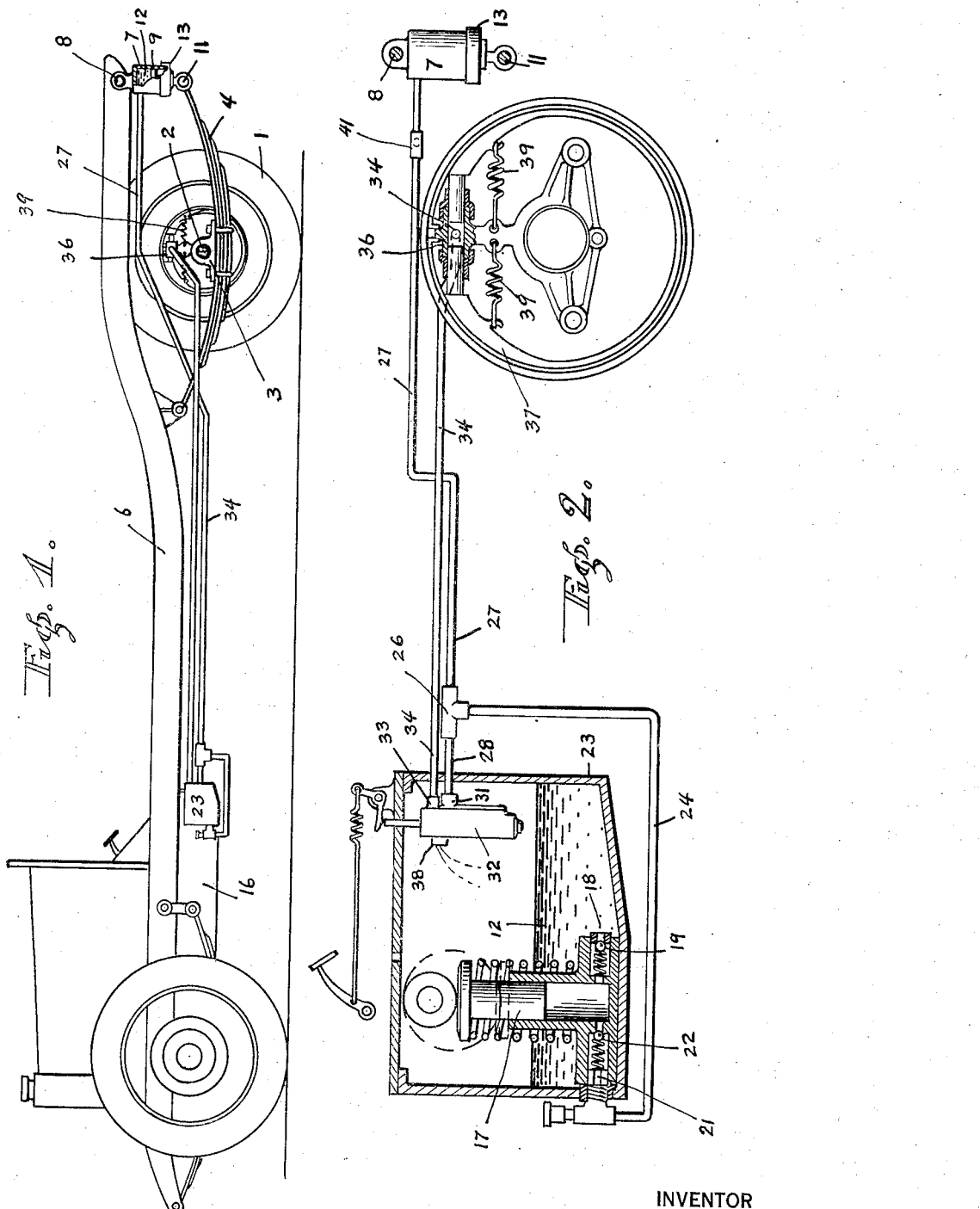
INVENTOR
JOY S. REYNOLDS
BY
Bradley L. Benson,
ATTORNEY Patented Dec. 11, 1928.

1,694,951

UNITED STATES PATENT OFFICE.

JOY S. REYNOLDS, OF DETROIT, MICHIGAN.

MEANS FOR MAINTAINING PRESSURE ON LIQUID FOR USE IN VEHICLE BRAKING.

Application filed February 16, 1926. Serial No. 88,514.

The present invention is an automatic means for maintaining pressure on liquid for use in vehicle braking.

The principal object of my invention is the provision of means for maintaining pressure on a quantity of liquid to operate a brake mechanism or the like, which will obviate the necessity of a pressure tank, and automatic cut-out mechanism. In hydraulic brake systems it is customary to create a pressure in a storage tank by pumping liquid into a closed container and thereby compressing air, or other expansive medium, to react in the subsequent discharge of said liquid to the work to be done. This invention contemplates the use of the weight of the body of a vehicle which is directly applied on a relatively small quantity of liquid to create the required pressure.

It results from this method that, in case of repeated operations, the last operation will be accomplished with exactly the same working pressure as the first. This is not the case where expansive mediums are employed.

One distinct advantage of my invention is that the degree of pressure available to apply brakes to a vehicle will always be in exact proportional relation to the load carried by the vehicle and will automatically fluctuate therewith.

In this specification and the annexed drawings, the invention is illustrated in the form considered to be the best, but it is not limited to such form because it may be embodied in other forms, and it is also to be understood that in and by the claims following the description it is desired to cover the invention in whatever form it may be embodied.

In the accompanying drawings

Figure 1 is a fragmentary view of a chassis of an automobile showing an engine and a rear wheel brake element.

Figure 2 is a diagrammatic view partly in section, of a detail and showing its relation to the brake mechanism.

Referring to the drawings the numeral 1 indicates a drive wheel of an automobile, said wheel is mounted on an axle 2 revoluble in a bearing 3, secured to the middle of a semi-elliptical spring 4. The ends of spring 4 are usually shackled to the ends of frame 6. I choose to interpose at one end between spring 4 and frame 6 a cylinder 7 pivotally connected at 8 to the frame 6. Reciprocable in cylinder 7 is a piston 9, the outer end of which is slotted to admit the eye of the major leaf of spring 4 which is pivotally engaged with piston 9 by a pin 11.

At 12 I show a quantity of liquid in cylinder 7. At 13 I show a packing nut for holding the usual packing and for guiding the outer end of piston 9. In Figure 1, at 16, I show an automobile engine. From any moving part thereof, or from a suitable power takeoff, I derive power to operate a pump shown in Fig. 2, at 17.

The arrangement is such that the pump is driven continuously when the engine runs. Said pump is provided with an intake 18 governed by a check valve 19, and with a discharge 21 governed by a discharge check 22. Intake 18 is at the bottom of a liquid container 23. The discharge end 21 of the pump is connected to one end of pipe 24, the opposite end of which is connected to a T 26. To one leg of T 26 I connect one end of a pipe 27, the opposite end of which is connected to cylinder 7, near the top thereof. To the remaining leg of T 26 I connect one end of a pipe 28, the opposite end of which is connected to the intake orifice 31 of a control valve 32. To an outlet orifice 33 of control valve 32 I connect one end of a pipe 34, the opposite end of which is connected to a cylinder 36 containing piston means for expanding a brake drum 37 in a well known manner.

At 38 I show a discharge port adapted, when the control valve is operated to release brakes to spill into the reservoir 23.

The control valve 32 is described and claimed in United States Patent 1,474,164 issued to me on November 13, 1923. Assuming that the cylinder 7 and all pipes are filled with liquid if brake application is made by depressing the stem of control valve 32 liquid will be forced from cylinder 7 (by weight of the vehicle frame and its load) through pipes 27 and 28, through said control valve 32 and through pipe 34 to the expanding mechanism of brake band 37. This completes the brake application.

To release the brake the stem of control valve 32 is released, at which time the urge of springs 39, contracts brake band 37, forcing liquid back through pipe 34 to the control valve 32. The position of the valve is such that liquid from pipe 34 is discharged through the discharge orifice 38 of said valve to the bottom of the reservoir 23. As soon as liquid gravitates in reservoir 23 the pump 17 (running continuously) picks it up and forces it through pipes 24 and 27 to the cylinder 7, thus replenishing the system for repeated operation. The cylinder 7 is so proportioned that several brake applications may be made in rapid succession without said cylinder being depleted faster than the pump can replace liquid therein.

The capacity of reservoir 23 is sufficient to receive all the liquid in the system in case several brake applications were made while the engine was not running. As soon as the engine is started again the hydraulic brake system will be immediately and automatically restored to operation.

It is understood that in the arrangement shown the pump does not cease operation during operation of the engine but operates continuously and the cylinder 7 is to be understood as of a capacity to contain the liquid of the receptacle and thus if the liquid in the receptacle is depleted to below the inlet 18 liquid ceases to be discharged to the cylinders but is returned to the receptacle upon application of the brake.

I claim:

1. A means for maintaining pressure on liquid for use in vehicle braking comprising means interposed between the body of said vehicle and its spring suspension for creating pressure on a quantity of liquid, means for releasing said liquid under pressure to effect a brake application, and means for restoring said liquid to its source upon the release of said brake application.

2. An automatic means for maintaining pressure in liquid operated brake systems for vehicles comprising a cylinder interposed between the frame of said vehicle and resilient support therefor, a piston reciprocable in said cylinder and secured to one of said members, a pipe connecting said cylinder with a brake operating mechanism, a reservoir interposed in said pipe line, control valve means associated with said pipe line for, selectively, applying said brake mechanism hydraulically from said cylinder and for discharging liquid to said reservoir to release said brake mechanism.

3. An automatic means for maintaining pressure on liquid operated brake systems for vehicles comprising a cylinder interposed between the frame of said vehicle and resilient support therefor, a piston reciprocable in said cylinder and secured to one of said members, a pipe connecting said cylinder with a brake operating mechanism, a reservoir interposed in said pipe line, control valve means associated with said pipe line for, selectively, applying said brake mechanism hydraulically from said cylinder for discharging liquid to said reservoir to release said brake mechanism, and means for returning liquid from said reservoir to said cylinder for repeated operation.

4. An automatic means for maintaining pressure on liquid operated brake systems for vehicles comprising a cylinder interposed between the frame of said vehicle and resilient support therefor, a piston reciprocable in said cylinder and secured to one of said members, a pipe connecting said cylinder with a brake operating mechanism, a reservoir interposed in said pipe line, control valve means associated with said pipe line for, selectively, applying said brake mechanism hydraulically from said cylinder for discharging liquid to said reservoir to release said brake mechanism and means for returning liquid from said reservoir to said cylinder for repeated operation, said means deriving its power from the propelling mechanism of said vehicle.

5. That method of vehicle braking which consists in interposing a liquid container between the body of a vehicle and its support to create pressure on said liquid, applying brakes hydraulically by the use of said liquid under pressure, and returning said liquid to its source to make the system automatically regenerative.

6. In combination with an automobile frame provided with a spring suspension and with hydraulically operated brakes, a liquid container interposed between said frame and said spring suspension, piston means in said cylinder for causing the weight of said body to create pressure on liquid in said container, a pipe circuit including said cylinder and said brake mechanism and means interposed in said circuit for diverting liquid under pressure from said container to apply said brakes and means interposed in said circuit for returning liquid used in application of said brake to said container.

In testimony whereof I affix my signature.

JOY S. REYNOLDS.